United States Patent
Baclig et al.

(10) Patent No.: US 11,450,889 B2
(45) Date of Patent: Sep. 20, 2022

(54) HIGH-ENERGY DENSITY REDOX-ACTIVE EUTECTIC LIQUID

(71) Applicant: THE BOARD OF TRUSTEES OF THE LELAND STANFORD JUNIOR UNIVERSITY, Stanford, CA (US)

(72) Inventors: Antonio Baclig, Stanford, CA (US); William C. Chueh, Stanford, CA (US); Andrey Poletayev, Stanford, CA (US); Victoria Ng, Stanford, CA (US); Devi Ganapathi, Stanford, CA (US); Emily Penn, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 415 days.

(21) Appl. No.: 16/752,133

(22) Filed: Jan. 24, 2020

(65) Prior Publication Data
US 2020/0243912 A1  Jul. 30, 2020

Related U.S. Application Data

(60) Provisional application No. 62/798,664, filed on Jan. 30, 2019.

(51) Int. Cl.
*H01M 10/0569* (2010.01)
*H01M 10/0525* (2010.01)
*H01M 50/20* (2021.01)

(52) U.S. Cl.
CPC ... *H01M 10/0569* (2013.01); *H01M 10/0525* (2013.01); *H01M 50/20* (2021.01)

(58) Field of Classification Search
None
See application file for complete search history.

(56) References Cited

U.S. PATENT DOCUMENTS

| 8,802,301 B2 | 8/2014 | Halalay et al. | |
| 10,756,345 B2 * | 8/2020 | Beidaghi | H01M 10/054 |
| 2018/0309156 A1 * | 10/2018 | Smith | H01M 10/0525 |

FOREIGN PATENT DOCUMENTS

| JP | 2017-212174 A | 11/2017 |
| TW | 201813178 A | 4/2018 |

OTHER PUBLICATIONS

F. R. Brushett, J. T. Vaughey, A. N. Jansen, An all-organic non-aqueous lithium-ion redox flow battery. Adv. Energy Mater. 2, 1390-1396 (2012).
J. D. Milshtein, L. Su, C. Liou, A. F. Badel, F. R. Brushett, Voltammetry study of quinoxaline in aqueous electrolytes. Electrochim. Acta. 180, 695-704 (2015).
A. Shimizu et al., Liquid Quinones for Solvent-Free Redox Flow Batteries. Adv. Mater., 1606592 (2017).

(Continued)

*Primary Examiner* — Wyatt P McConnell
(74) *Attorney, Agent, or Firm* — Foley & Lardner LLP (57) ABSTRACT

An electrochemical device includes: (1) a compartment; (2) a container including a liquid reactant; and (3) a conveyance mechanism fluidly connected to the container and the compartment and configured to convey the liquid reactant from the container into the compartment, wherein the liquid reactant is a eutectic mixture of two or more different redox-active substances.

18 Claims, 5 Drawing Sheets

(56) References Cited

OTHER PUBLICATIONS

B. Huskinson, M. P. Marshak, C. Suh, S. Er, M. R. Gerhardt, C. J. Galvin, X. Chen, A. Aspuru-Guzik, R. G. Gordon, and M. J. Aziz, "A metal-free organic-inorganic aqueous flow battery.," Nature, vol. 505, No. 7482, pp. 195-198, Jan. 2014.

B. Yang, L. Hoober-Burkhardt, S. Krishnamoorthy, A. Murali, G. K. S. Prakash, and S. R. Narayanan, "High-Performance Aqueous Organic Flow Battery with Quinone-Based Redox Couples at Both Electrodes," J. Electrochem. Soc., vol. 163, No. 7, pp. A1442-A1449, May 2016.

C. Zhang et al., Biredox Eutectic Electrolytes Derived from Organic Redox-Active Molecules: High-Energy Storage Systems. Angew. Chemie. 131, 7119-7124 (2019).

* cited by examiner

HIGH-ENERGY DENSITY REDOX-ACTIVE EUTECTIC LIQUID

CROSS-REFERENCE TO RELATED APPLICATIONS

This application claims the benefit of U.S. Provisional Application No. 62/798,664, filed Jan. 30, 2019, the contents of which are incorporated herein by reference in their entirety.

TECHNICAL FIELD

This disclosure generally relates to a eutectic mixture of two or more different redox-active substances as a liquid reactant for an electrochemical device.

BACKGROUND

The growth of variable wind and solar energy specifies advanced energy storage options. Despite large strides by lithium (Li)-ion batteries in the last decade, cost remains an issue for large-scale deployment in vehicles and on the grid, and the resource availability of elements such as cobalt and lithium can be a long-term constraint. Flow batteries have an attractive battery architecture due to their scalability, long cycle life, and power-to-energy tunability. However, despite being proposed at nearly the same time in the mid-1970s as Li-ion batteries, flow batteries have not achieved the same level of progress as have Li-ion batteries. A significant reason for the different trajectories of the two battery technologies is their energy densities. The low energy density of flow batteries (typically about 10-50 Wh/kg (practical)) makes them primarily applicable for grid-scale storage, while the high-energy density of Li-ion batteries (typically about 250 Wh/kg practical (cell level)) allows their use in transportation, electronics, and the grid. A flow battery with an energy density comparable to Li-ion batteries can unlock applications such as electric vehicles with ultra-long cycle lives, higher charging rates, and lower costs, accelerating the electrification of transportation and allowing greater adoption of flow batteries to store wind and solar energy.

It is against this background that a need arose to develop embodiments of this disclosure.

SUMMARY

In some embodiments, an electrochemical device includes: (1) a compartment; (2) a container including a liquid reactant; and (3) a conveyance mechanism fluidly connected to the container and the compartment and configured to convey the liquid reactant from the container into the compartment, wherein the liquid reactant is a eutectic mixture of two or more different redox-active substances, and optionally further includes one or more non-redox-active substances.

In additional embodiments, a liquid reactant for an electrochemical device includes a eutectic mixture of two or more different redox-active compounds, wherein the two or more different redox-active compounds account for at least 70% by weight of the liquid reactant, and a melting temperature of the liquid reactant is below room temperature. Of the two or more different redox-active compounds, one or more of the redox-active compounds can be organic redox-active compounds, and optionally one or more of the redox-active compounds can be inorganic redox-active compounds.

In further embodiments, a method of operating an electrochemical device includes conveying the liquid reactant of any of the foregoing embodiments into a compartment of the electrochemical device.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Comparative flow batteries tend to have a low energy density (e.g., about 1/10th that of Li-ion batteries) due to a weight and a volume of a solvent (water) included in their anolytes (or negolytes) and catholytes (or posolytes) that result in a low concentration of redox-active species. The hurdle to a high-energy density flow battery is developing negolytes and posolytes that remain in a liquid state at high concentrations of redox-active components. Proposals so far have included nonaqueous solutions, hybrid concepts with solid anodes, semi-solid flow batteries, and ionic liquids or deep eutectic solvents. However, these proposals generally fail to achieve the energy density of Li-ion batteries, and generally fail to achieve a combination of desired metrics specified for application of flow batteries. The low energy density contributes in myriad ways to an increase in cost of a flow battery. To achieve a high-energy density, a redox-active liquid that omits the use of a solvent, however, is a difficult challenge, which is addressed by embodiments of this disclosure.

Embodiments of this disclosure exploit the mixing behavior of redox-active (or electrochemically active) substances in order to achieve a high-energy density. By selecting appropriate mixtures of redox-active substances that are otherwise solid at room temperature (25° C.), catholytes or anolytes that are in a liquid state at room temperature can be formed via eutectic behavior, namely a reduction in melting points via mixing. In some embodiments, quinones (e.g., benzoquinone derivatives), quinoxalines (e.g., benzopyrazine derivatives), or both are used as redox-active substances that are mixed to form liquids at or below room temperature, although the technique can be applied to other redox-active substances. In contrast to a deep eutectic solvent, which has both an acid/donor and base/acceptor, one or both of which are typically not redox-active, all or nearly all of components of a mixture of some embodiments can be redox-active that are reduced (or oxidized) upon discharge, allowing a high-energy density. Compared to other catholytes and anolytes, a eutectic mixture of redox-active substances allows omission of a solvent and can have a much higher energy density (e.g., about 5-10 times greater). Thus, a high-energy density redox-active liquid is attained through eutectic mixing of redox-active substances. Such a mixture can be used as a catholyte or an anolyte in a flow battery, or can be supplied as a liquid reactant to a positive or negative side of a fuel cell.

In some embodiments, eutectic mixtures of redox-active substances can be formed from quinones, which encompass a class of organic compounds including a fully conjugated cyclic dione structure and which also encompass their derivatives in which one or more hydrogen atoms are replaced with substituent groups. Because each quinone molecule can accept two electrons, and quinones can be relatively small molecules (e.g., 1,4-benzoquinone, $C_6H_4O_2$, Molecular Weight (MW)=108 g/mol), quinones are desirable for high-energy density catholytes. In general, the melting points of quinones are above room temperature; however, it is demonstrated that via the properties of eutectic mixtures, the melting points can be brought to below room temperature. Selection of redox-active substances from a large space of organic compounds to form a mixture is beneficial as this can allow tuning of a melting point, an open-circuit voltage, a viscosity, and other properties of the mixture at different states of charge, since these properties can vary differently for different compounds at different states of charge. It may be beneficial, for example, to have redox-active substances with similar standard reduction potentials so that they undergo redox reactions at a similar voltage.

Figure 1:
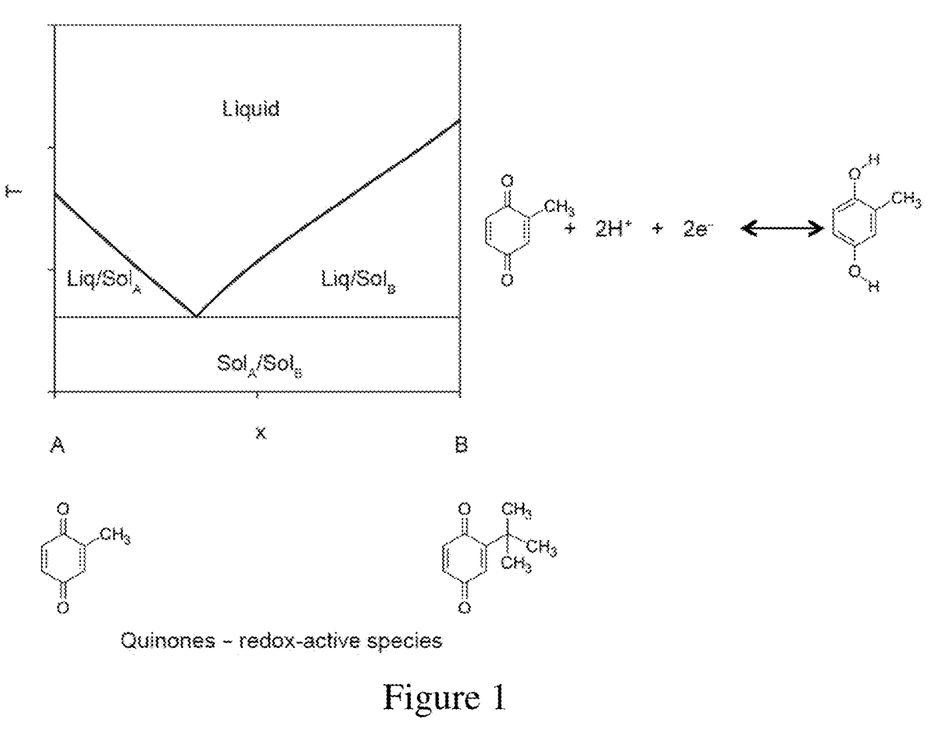
FIG. 1. Redox-active eutectic liquid.

Specific examples of quinones include 1,4-benzoquinone (and its derivatives) including 0, 1, 2, 3, or 4 substituents groups, such as selected from hydrocarbon groups including 1 to 7, 1 to 6, 1 to 5, or 1 to 4 carbon atoms (e.g., methyl, propyl (or n-propyl), isopropyl, butyl (or n-butyl), sec-butyl, isobutyl, tert-butyl, and so forth), halogen groups, ether groups, cyano groups, and so forth. 1,4-benzoquinone (and its derivatives) can have a MW up to or less than about 250 g/mol, although higher MW's are also encompassed. FIG. 1 shows a phase diagram of an example binary mixture of two different 1,4-benzoquinone derivatives, namely methyl-1,4-benzoquinone and 2-tert-butyl-1,4-benzoquinone. Although the individual 1,4-benzoquinone derivatives have melting temperatures above room temperature, mixing the two 1,4-benzoquinone derivatives yields a eutectic mixture that is in a liquid state at room temperature. Further, the 1,4-benzoquinone derivatives can be reduced by accepting electrons (to result in conversion of ketone groups —C(=O)— to hydroxyl groups —C(—OH)—), and are, thus, redox-active.

Other examples of quinones include 1,2-benzoquinone (and its derivatives), naphthoquinone (e.g., 1,4-naphthoquinone and its derivatives), and anthraquinone (e.g., 9,10-anthraquinone and its derivatives) including 0, 1, 2, 3, 4, or more substituents groups, such as selected from hydrocarbon groups including 1 to 7, 1 to 6, 1 to 5, or 1 to 4 carbon atoms, halogen groups, ether groups, cyano groups, and so forth. Quinones can have a MW up to or less than about 250 g/mol, although higher MW's are also encompassed. Other redox-active organic compounds are encompassed, such as other organic compounds including one or more reducible functional groups (e.g., ketone groups), and other organic compounds including one or more oxidizable functional groups (e.g., hydroxyl groups). Reducible characteristic of redox-active organic compounds can be characterized in terms of their reduction potentials relative to a standard electrode (e.g., standard hydrogen electrode), such as having a non-zero magnitude at room temperature of about 1 millivolts (mV) or greater, about 10 mV or greater, or about 100 mV or greater, and oxidizable characteristic of redox-active organic compounds can be characterized in terms of their oxidation potentials relative to a standard electrode (e.g., standard hydrogen electrode), such as having a non-zero magnitude at room temperature of about 1 mV or greater, about 10 mV or greater, or about 100 mV or greater.

In some embodiments, eutectic mixtures of redox-active substances can be formed from quinoxalines (or benzopyrazines), which encompass a class of heterocyclic aromatic compounds with relatively low melting points and molecular weights, and which also encompass their derivatives in which one or more hydrogen atoms are replaced with substituent groups. The doubly nitrogen-substituted aromatic ring in quinoxalines allows for two-electron redox chemistry. Eutectic mixtures of redox-active substances also can be formed from quinolones, quinazolines, pyrazines, and their respective derivatives.

A redox-active eutectic liquid can be a binary, ternary, quaternary, quinary, or higher order mixture of 2, 3, 4, 5, or more different redox-active substances. In some embodiments, the redox-active eutectic liquid can be substantially devoid of a solvent (e.g., water or an organic solvent), and the redox-active substances can account for at least about 70% by weight of the eutectic liquid, such as at least about 75% by weight, at least about 80% by weight, at least about 85% by weight, at least about 90% by weight, or at least about 95% by weight, and up to about 98% by weight or more. In some embodiments, the redox-active eutectic liquid can include an additive as a minority component by weight to increase an ionic conductivity and further reduce a melting point, such as a metal-containing salt (e.g., an alkali metal-containing salt such as a lithium-containing salt, a sodium-containing salt, or a potassium-containing salt), and with a balance by weight accounted by the redox-active substances.

Figure 2:
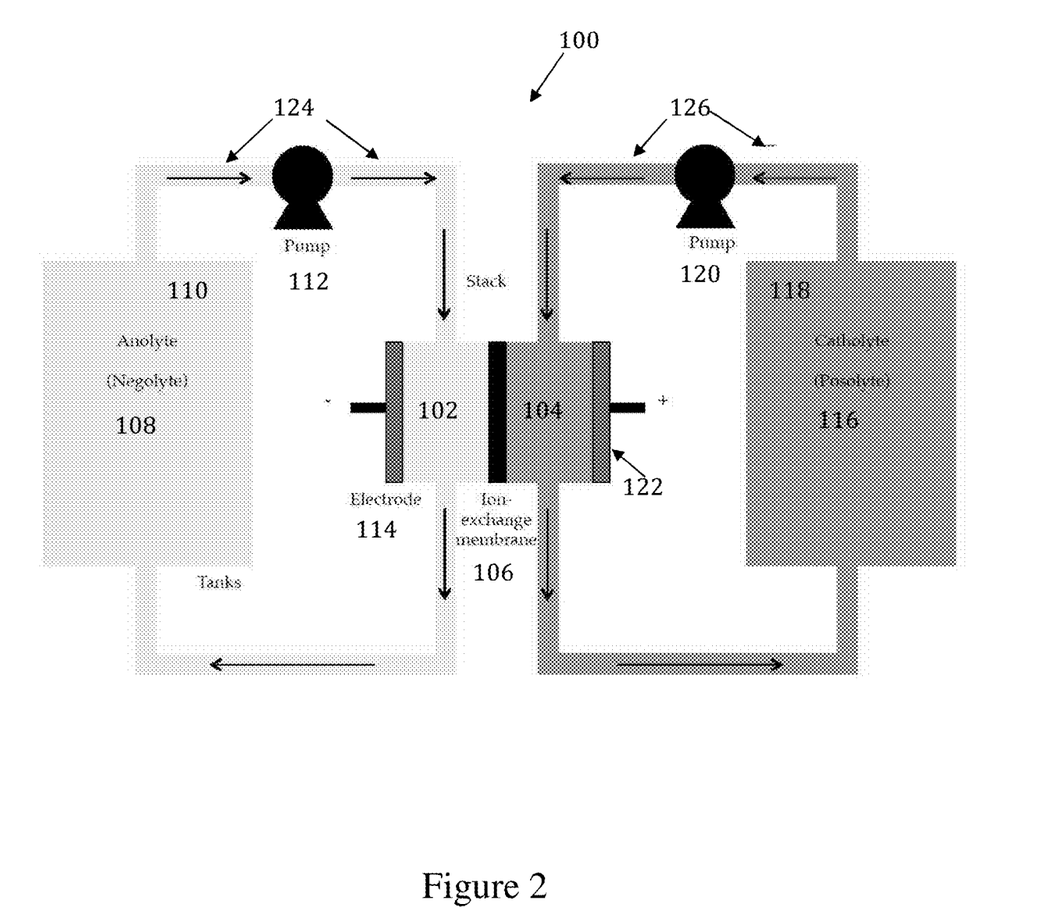
FIG. 2. Schematic of a flow battery.

FIG. 2 below is a schematic of an example embodiment of an electrochemical device implemented as a flow battery 100. The battery 100 includes a negative electrode compartment 102 and a positive electrode compartment 104, which are separated by an ion-exchange membrane 106 (or separator) disposed between the negative electrode compartment 102 and the positive electrode compartment 104. An anolyte 108 is conveyed by an anolyte conveyance mechanism that is fluidly connected to the negative electrode compartment 102; specifically, the anolyte 108 is conveyed from a container 110 by a pump 112, and is circulated as a liquid reactant into the negative electrode compartment 102 past the membrane 106 and out of the negative electrode compartment 102 through a set of conduits 124. Included in the negative electrode compartment 102 is a negative electrode 114. The membrane 106 includes an ionically-conducting material. A catholyte 116 is conveyed by a catholyte conveyance mechanism that is fluidly connected to the positive electrode compartment 104; specifically, the catholyte 116 is conveyed from a container 118 by a pump 120, and is circulated as a liquid reactant into the positive electrode compartment 104 past the membrane 106 and out of the positive electrode compartment 104 through a set of conduits 126. Included in the positive electrode compartment 104 is a positive electrode 122. During operation of the battery 100, the anolyte 108 is oxidized in the negative electrode compartment 102, the catholyte 116 is reduced in the positive electrode compartment 104, and resulting ions are transported through the membrane 106. Either of, or both, the catholyte 116 and anolyte 108 can be a redox-active eutectic liquid as previously discussed. For example, the catholyte 116 can be a eutectic mixture of two or more different redox-active organic compounds. As another example, the anolyte 108 can be a eutectic mixture of two or more different redox-active organic compounds. As another example, one of the catholyte 116 or the anolyte 108 can be a eutectic mixture of two or more different redox-active organic compounds, and another of the catholyte 116 or the anolyte 108 can be the same or a different eutectic mixture of two or more different redox-active organic compounds, other catholyte (or anolyte) that can be used for redox flow batteries, or a liquid metal. Ions that are exchanged between the negative electrode compartment 102 and the positive electrode compartment 104 can be protons ($H^+$), or alkali metal ions, such as lithium ions (Lit), sodium ions ($Na^+$), or potassium ions ($K^+$), or other cations or anions or a combination thereof.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Melting Points and Redox Behavior of Benzoquinone Derivatives

Melting Points:

Experimental demonstration focused on a set of 7 benzoquinone derivatives, listed in Table 1. It is observed that mixtures of two of these quinones have lower melting points than the individual components; in other words, these redox-active molecules have eutectic behavior. Moreover, it is shown that melting points below room temperature can be achieved, and that eutectic points can be predicted via a regular solution model.

Figure 3:
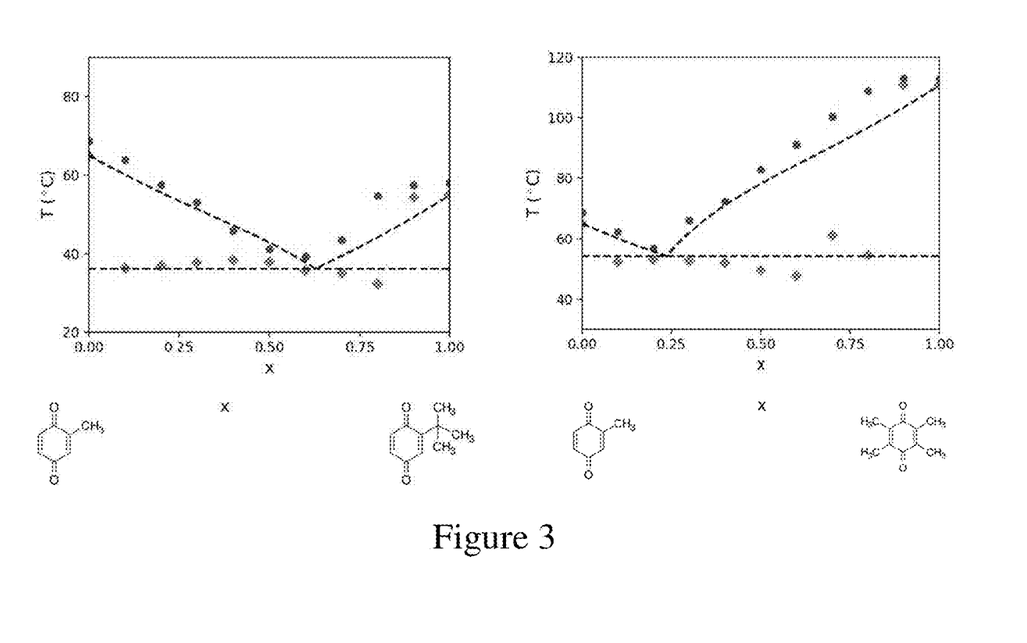
FIG. 3. Comparison of melting behavior to a regular solution thermodynamic model (dashed lines). Dots: liquidus points, diamonds: solidus points, from differential scanning calorimetry. Left: binary system of Q2-Q5 (x=mol. % of Q5). Right: binary system of Q2-Q12 (x=mol. % of Q12).

FIG. 3 shows that systems evaluated in detail have phase diagrams that are qualitatively very similar to that predicted by a regular solution model, if an interaction term is chosen appropriately. FIG. 3 shows eutectic behavior in mixtures of Q2-Q5 and Q2-Q12, which are quinones with alkyl groups as substituent groups. Eutectic behavior is also observed in other mixtures with quinones with halogen groups as substituent groups. In a mixture of Q4-Q12, the model predicted a eutectic melting point of 47° C., and measurement yielded about 46° C. In a mixture of Q4-Q26, the model predicted a eutectic melting point of 50° C., and measurement yielded about 48° C.

Examining higher-component mixtures, it is found that these mixtures have even lower melting points. By taking one data point from each binary mixture of the 7 components in Table 1, calculation is performed of interaction terms from the thermodynamic model and these terms are used to predict the eutectic points of some higher-component mixtures. In the mixture of Q2-Q5-Q6, the model predicted a eutectic melting point of 30° C., and measurement yielded about 31° C. In a mixture of Q6-Q12-Q3, the model predicted a eutectic melting point of 42° C., and measurement yielded about 44° C. Moreover, the composition of the eutectic point predicted by the model appears to be very close to the actual composition from the differential scanning calorimetry curve, which showed a single peak in both cases (with a small later hump in the former case). In a mixture of Q2-Q3-Q5, the model predicted a eutectic melting point of 21° C., and measurement yielded about 17° C. To a 1:1:1 mixture of Q2-Q3-Q5 was added about 1 M of lithium bis(trifluoromethanesulfonyl)imide (LiTFSI). This reduced the melting point by about 6° C. and resulted in a room temperature ionic conductivity of about 0.62 mS/cm. In a mixture of Q2-Q3-Q5-Q6-Q12-Q22, the model predicted a eutectic melting point of 2° C., and measurement yielded about −2° C.

TABLE 1

Quinones evaluated.

| Code | Molecule Name | Melting Point (° C.) |
|---|---|---|
| Q1 | 1,4-benzoquinone | 114 |
| Q2 | Methyl-1,4-benzoquinone | 66 |
| Q3 | 2,6-Dimethylbenzoquinone | 72 |
| Q4 | 2-Chloro-1,4-benzoquinone | 56 |
| Q5 | 2-tert-Butyl-1,4-benzoquinone | 56 |
| Q6 | 2,5-Dimethyl-1,4-benzoquinone | 124 |
| Q12 | 2,3,5,6-Tetramethyl-1,4-benzoquinone | 111 |
| Q22 | 2-Isopropyl-5-methyl-1,4-benzoquinone | 46 |
| Q26 | 2,5-Dichloro-1,4-benzoquinone | 161 |

Quinoxaline (or benzopyrazine) is a heterocyclic aromatic derivative of pyrazine. Quinoxaline and its derivatives encompass a class of molecules with relatively low melting points and molecular weights (Table 2). The doubly nitrogen-substituted aromatic ring of pyrazine in quinoxalines allows for two-electron redox chemistry. Further exploration is made of mixtures of quinoxalines as high-energy posolytes.

TABLE 2

Quinoxalines evaluated.

| Abbreviation | Molecule Name | Melting Point, ° C. | Molecular Mass, g/mol |
|---|---|---|---|
| QO | Quinoxaline | 32 | 130.12 |
| 5MQO | 5-methylquinoxaline | 17 | 144.17 |
| 2ClQO | 2-chloroquinoxaline | 45 | 164.59 |
| 6ClQO | 6-chloroquinoxaline | 60 | 164.59 |
| 4HQO | 5,6,7,8-tetrahydroquinoxaline | −8 | 134.18 |

In particular, it is found that a mixture of QO-5MQO-6ClQO (QO3 mixture) melts at about −6° C., and thus exhibits eutectic behavior in agreement with the regular solution model that predicts a eutectic melting point of −10° C.

Small amounts (e.g. about 20% by weight or less) of non-redox-active substances with low melting points (e.g., a melting point of about −30° C. or less), such as solvents like propylene carbonate (−48° C.) or diglyme (−64° C.), can further serve to lower a melting point of a liquid composed primarily of redox-active compounds.

Charged ionic liquids with inorganic compounds can provide additional conductivity and redox capacity. Charged ionic liquids can possess dielectric permittivities substantially higher than organic compounds that are redox-active, allowing more efficient accommodation of extra charge. Eutectic liquids, such as mixtures of iron chloride with imidazolium-based or choline-based compounds, can also possess redox-active capacity.

Demonstration is made that a room temperature conductivity of the QO3 mixture with about 1 M potassium triflate at room temperature is about 0.02 mS cm$^{-1}$, but an addition of about 10 vol. % (about 15 wt. %) of 1:1 mixture of FeCl$_3$ and 1-butyl-3-methylimidazolium chloride (BMIM-Cl) improves the conductivity to about 0.23 mS cm$^{-1}$ in part through improved incorporation of the potassium triflate into a liquid phase.

Electrochemistry:

In order to evaluate the use of mixtures of quinones in a battery, experimental demonstration is made of their ability to be reduced. It is shown that a current can be applied, using a proton source as a negative electrode, a sulfonated tetrafluoroethylene-based fluoropolymer-copolymer (available as Nafion) membrane, and a six quinone-component mixture with some added anthraquinone-2,7-disulfonic acid disodium salt to provide ionic conductivity.

Figure 4:
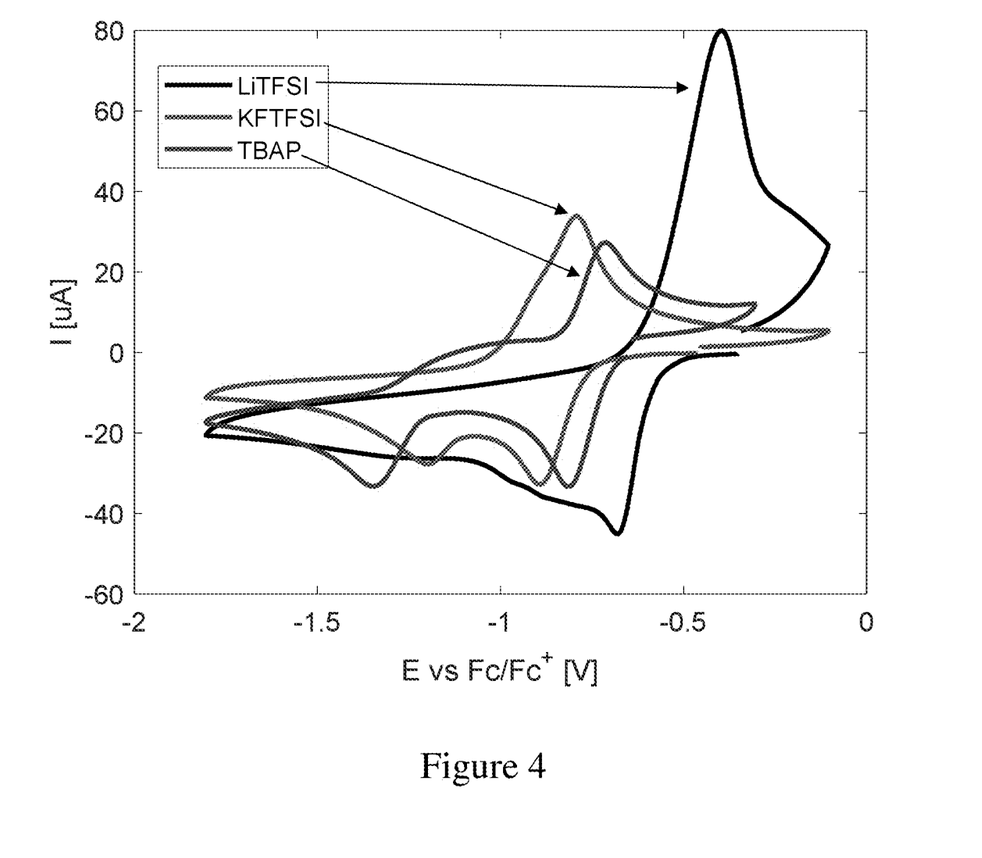
FIG. 4. Cyclic voltammograms of a mixture of about 1 mM of Q1 in propylene carbonate and about 0.1 M of either lithium bis(trifluoromethanesulfonyl)imide (LiTFSI), potassium (flourosulfonyl)-(triflouromethanesulfonyl)imide (KFTFSI), or tetrabutylammonium perchlorate (TBAP).

The species of an ion exchanged in a flow battery can affect the properties of a eutectic mixture at different states of charge, such as melting point, open-circuit voltage and redox behavior, viscosity, and other properties of the mixture. For example, and referring to FIG. 4, to a mixture of about 1 mM of Q1 in propylene carbonate was added about 0.1 M of either LiTFSI, potassium (flourosulfonyl)-(triflouromethanesulfonyl)imide (KFTFSI), or tetrabutylammonium perchlorate (TBAP). Cyclic voltammograms were then collected with a glassy carbon electrode. The K$^+$-containing sample showed two distinct reduction peaks separated by about 0.5 V in the cyclic voltammogram, similar to the TBAP-containing sample, while the Lit-containing sample showed two reduction peaks that were substantially overlapped, indicating that Q1 interacts differently with K$^+$ and Li$^+$ in propylene carbonate.

Experimental demonstration is made of electrochemical reduction of the QO3 mixture with about 0.25 M potassium (fluorosulfonyl)(trifluoromethylsulfonyl)imide (K(FS)(TFS)I) by passing K$^+$ ions into it via a K β"-alumina ceramic membrane from a Na—K eutectic anolyte. The QO3 mixture served as a positive electrode, and the metallic Na—K eutectic as a negative electrode. Reversal of current was attained to re-oxidize the QO3 mixture Similar reduction and re-oxidization was attained with the QO3 mixture with about 0.5 M K(FS)(TFS)I and about 10 vol. % (about 15 wt. %) of 1-butyl-3-methylimidazolium tetrachloroferrate (BMIM-Cl). Higher potentials at which the reduction and subsequent oxidation occurred, relative to QO3 alone, confirm the participation of the Fe species in the redox reactions.

Thermodynamic Model:

Immiscible Solids Model for Binary Mixture

Figure 5:
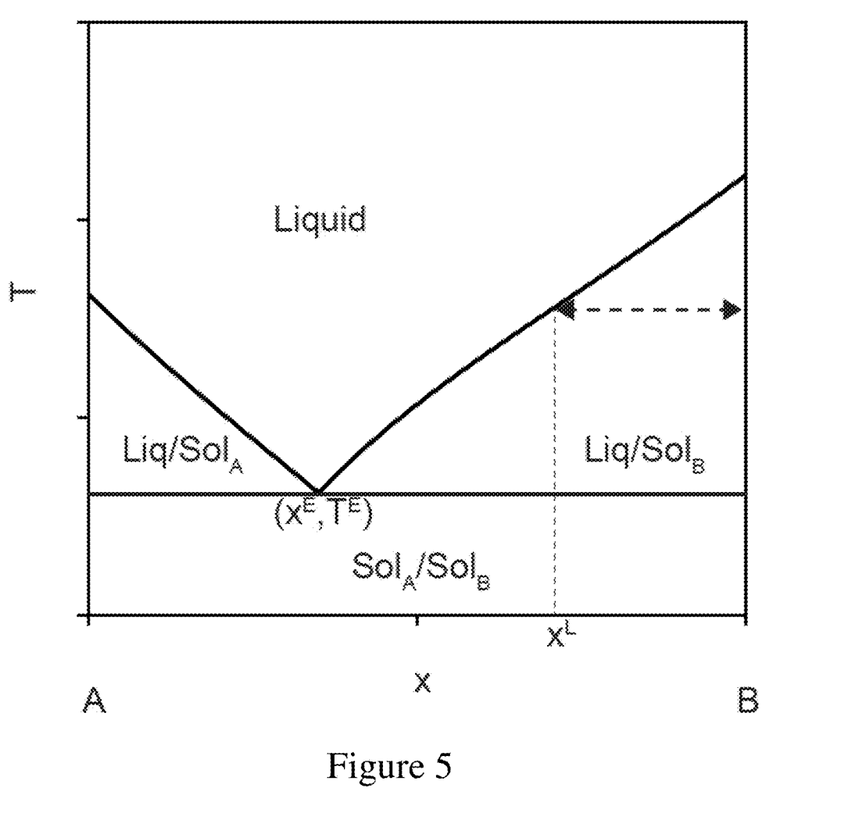
FIG. 5. Eutectic phase diagram.

Assume two components, A and B. In certain circumstances, the mixture of A and B will form a liquid phase, L, with a lower melting point than either A or B. The lowest melting point mixture is termed the eutectic composition, which is the composition where the liquid can be in thermodynamic equilibrium with both solid phases (by the Gibbs phase rule, there are no degrees of freedom with 3 phases and 2 components, assuming pressure is constant). In FIG. 5, this is shown by the point ($x^E$, $T^E$).

The calculation of the eutectic melting point is simplified if one assumes that A and B have immiscible solid phases. In other words, the solid B (sol$_B$) is always a stoichiometric compound of 100% B that does not allow any A into its lattice, and vice-versa. For some molecular solids, this is a good approximation. This assumption is called the "immiscible solids" assumption. Further assumption is made that differences in heat capacities between the solid and liquid phases are negligible.

In this example, the reference state for each component is taken to be its pure solid phase. The benefit of this choice is that one can write the energy of the liquid phase of the component with just the knowledge of the melting temperature ($T_B^{melt}$) and enthalpy of melting ($H_B^{melt}$), using the Turnbull approximation:

$$g_B^L - g_B^{solB} = H_B^{melt}(T/T_B^{melt} - 1)$$

Note that in this example instead of total quantities (e.g., J) represented by G, for simplicity reference is made to molar quantities (e.g., J/mol) of the Gibbs free energy, g=G/N, where N is the total number of moles. For a pure solution, g=μ (specified below), but not for a mixture. The Gibbs free energy of the liquid mixture is given by:

$$g_L = xg_B^L + (1-x)g_A^L + g_{ID}^{mix} + g_{EX}^{mix}$$

where x is the molar fraction of component B, $g_B^L$ and $g_A^L$ are the Gibbs free energies of the pure component liquids, and $g_{ID}^{mix}$ and $g_{EX}^{mix}$ are the ideal and excess free energies of mixing. Under the regular solution model, the ideal free energy of mixing is the ideal entropy of mixing:

$$g_{ID}^{mix} = RT(x \ln x + (1-x)\ln(1-x))$$

and the excess free energy of mixing is given by:

$$g_{EX}^{mix} = \mathcal{L} x(1-x)$$

From the expression for the Gibbs free energy, one can derive its partial molar property, which is the chemical potential:

$$\mu_B^L = \left(\frac{\partial G}{\partial n_B}\right)_{T,P,n_A} = g_B^L + RT\ln x + \mathcal{L}(1-x)^2$$

and likewise for A.

In the two phase region on the B side of the phase diagram (FIG. 5), there is an equilibrium between the L and B phases. Since there is no solubility of component A in solid B, further consideration of component A is omitted. Thus consideration is made of meeting the chemical potential equilibrium condition on B, namely that the chemical potential of B is the same in both the solid of pure B and liquid of composition $x^L$:

$$\mu_B^L|_{x^L} = \mu_B^{solB}$$
$$\Rightarrow g_B^L + RT\ln x + \mathcal{L}(1-x)^2 = \mu_B^{solB}$$
$$\Rightarrow (g_B^L - g_B^{solB}) + RT\ln x^L + \mathcal{L}(1-x^L)^2 = 0$$

The first term in parentheses is the difference in free energy between pure liquid B and pure solid B at a certain temperature T (note, for a pure solution g=μ), which can be expressed using the Turnbull approximation above. This gives an equation for each component i:

$$H_i^{melt}(T/T_i^{melt} - 1) + RT^E \ln x_i^E + \mathcal{L}(1-x_i^E)^2 = 0$$

In the binary mixture, there are two equations, which can be solved for two variables ($x^E$, $T^E$).

Immiscible Solids Model for n Components

For a mixture of n components, denoted by i=1, 2, 3, . . . , n, the generalized form of the Gibbs free energy of mixing in the model is:

$$g_{ID}^{mix} = -RT \sum_{i=1}^{n} x_i \ln(x_i)$$

$$g_{EX}^{mix} = \frac{1}{2} \sum_{j \neq i} \sum_{i} \mathcal{L}_{ij} x_i x_j$$

where $L_{ij}$ is the interaction parameter between components i and j, and the factor ½ is included because of summing over each index twice. Note that this is the most basic form of the regular solution model that can be chosen; more complex models can include ternary and higher-order interaction parameters (e.g., $L_{123}x_1x_2x_3$), as well as using non-symmetrical parameters through Margules equations; and beyond that, including temperature dependence in a non-regular solution model.

As used herein, the singular terms "a," "an," and "the" may include plural referents unless the context clearly dictates otherwise. Thus, for example, reference to an object may include multiple objects unless the context clearly dictates otherwise.

As used herein, the terms "connect," "connected," and "connection" refer to an operational coupling or linking. Connected objects can be directly coupled to one another or can be indirectly coupled to one another, such as via one or more other objects.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. An electrochemical device, comprising:
    a compartment;
    a container including a liquid reactant; and
    a conveyance mechanism fluidly connected to the container and the compartment and configured to convey the liquid reactant from the container into the compartment,
    wherein the liquid reactant is a eutectic mixture of two or more different redox-active substances.

2. The electrochemical device of claim 1, wherein the eutectic mixture includes two or more different redox-active organic compounds.

3. The electrochemical device of claim 2, wherein the eutectic mixture further includes a redox-active inorganic compound.

4. The electrochemical device of claim 2, wherein the two or more different redox-active organic compounds include reducible functional groups.

5. The electrochemical device of claim 2, wherein the two or more different redox-active organic compounds include ketone groups.

6. The electrochemical device of claim 2, wherein the two or more different redox-active organic compounds each has a molecular weight up to or less than 250 g/mol.

7. The electrochemical device of claim 2, wherein the two or more different redox-active organic compounds are selected from quinones.

8. The electrochemical device of claim 2, wherein the two or more different redox-active organic compounds are selected from quinones, quinoxalines, quinolones, quinazolines, pyrazines, and combinations thereof.

9. The electrochemical device of claim 2, wherein the two or more different redox-active organic compounds account for at least 70% by weight of the liquid reactant.

10. The electrochemical device of claim 1, wherein the compartment, the container, the liquid reactant, and the conveyance mechanism are a first compartment, a first container, a first liquid reactant, and a first conveyance mechanism, respectively, and the electrochemical device further comprises:
    a second compartment;
    a second container including a second liquid reactant;
    a second conveyance mechanism fluidly connected to the second container and the second compartment and configured to convey the second liquid reactant from the second container into the second compartment; and
    an ion-exchange membrane or separator disposed between the first compartment and the second compartment.

11. A liquid reactant for an electrochemical device, comprising a eutectic mixture of two or more different redox-active organic compounds, wherein the two or more different redox-active organic compounds account for at least 70% by weight of the liquid reactant, and a melting temperature of the liquid reactant is below room temperature.

12. The liquid reactant of claim 11, wherein the two or more different redox-active organic compounds include ketone groups.

13. The liquid reactant of claim 11, wherein the two or more different redox-active organic compounds are selected from quinones.

14. The liquid reactant of claim 11, wherein the two or more different redox-active organic compounds account for at least 80% by weight of the liquid reactant.

15. The liquid reactant of claim 11, wherein the two or more different redox-active organic compounds account for at least 90% by weight of the liquid reactant.

16. The liquid reactant of claim 11, further comprising a metal-containing salt.

17. A method of operating an electrochemical device, comprising conveying the liquid reactant of claim 11 into a compartment of the electrochemical device.

18. The method of claim 17, wherein the liquid reactant is reduced in the compartment of the electrochemical device.

* * * * *